G. MORGAN.
Traction-Wheel.
No. 7,427.
Patented June 11, 1850
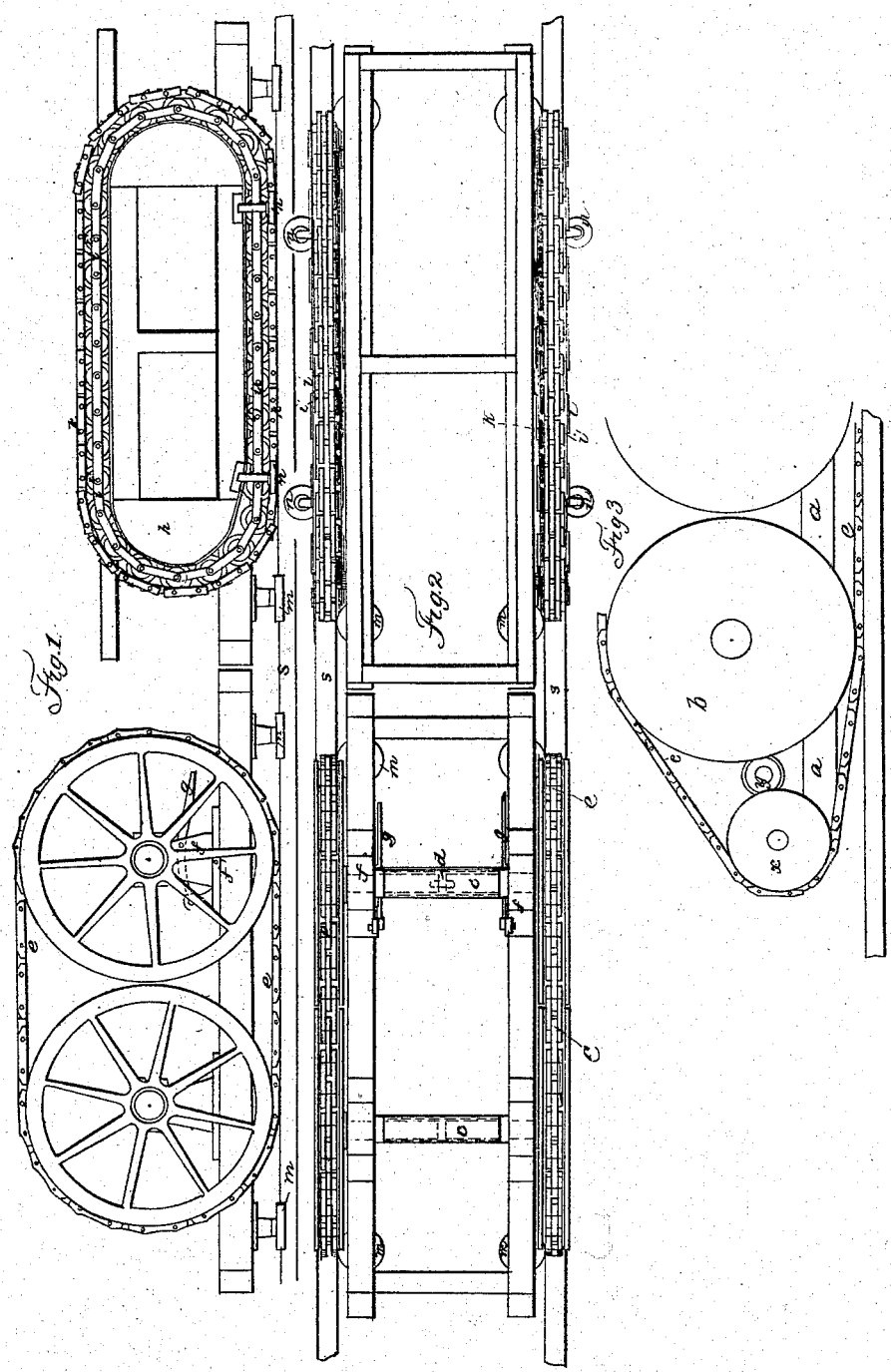

UNITED STATES PATENT OFFICE.

GIDEON MORGAN, OF CALHOUN, TENNESSEE.

CAR FOR PLANK ROADS, WOODEN RAILS, &c.

Specification of Letters Patent No. 7,427, dated June 11, 1850.

*To all whom it may concern:*

Be it known that I, GIDEON MORGAN, of Calhoun, in the county of McMinn and State of Tennessee, have invented certain new and useful Improvements in Locomotives and Cars for Transportation, and that the following is a full, clear, and exact description of the principle or character which distinguishes them from all other things before known and of the usual manner of making, modifying, and using the same, reference being had to the accompanying drawing, in which—

Figure 1, is a side elevation; Fig. 2, is a top plan, Fig. 3, modification.

My invention consists in the mode of employing endless chains around proper guides for supporting and carrying a car or locomotive, and in the manner of keeping the chains tight; by which I obtain greater adhesion to the track, and a greater facility of draft on the car.

The construction is as follows: I form an oblong frame ($a$) proper for sustaining the boiler and machinery of a locomotive or of a car all of which parts, being of ordinary construction, I have not shown; this frame is below the axles, and is suspended by proper boxes, to the axles of the four wheels ($b$,) which are of large diameter. The axles of each pair of these wheels are divided in the center, as shown in Fig. 2, by dotted lines. They are there inclosed in a tube ($c$,) that keeps them in line; a hole is drilled into the ends of the short axles, next each other, at the center, into which a pin ($d$,) fits, to aid in keeping the parts in place; on the periphery of these wheels ($b$,) there is a groove, in which, on each side, endless chains ($e$,) are guided, that pass over both wheels of one side, as clearly shown in Fig. 1. The chain is formed of flat links, united by pins running through them, the links overlapping each other so as to present a nearly even surface of three or more plates in breadth, like the chain of a watch. This chain, as the wheels revolve, comes in contact with the road, and adds to the adhesion of the parts.

In addition to the mode of conducting the chain, shown in the drawing, I sometimes intend to place a small wheel ($x$) and pulley ($y$) see Fig. 3, in advance of the forward wheel, over which the chain passes, so as to be laid in front of the advancing wheel on the track, around which the chains also pass, and by means of which the chains are laid on the track before the carrying wheels strike them. By thus carrying out the chain in advance of the drivers, a steadier motion is obtained and a better action insured.

One pair of the carrying wheels ($b$,) are supported on bearings connected with the frame by joints at ($f'$); to each of these jointed pedestals ($f$,) a lever ($g$,) is affixed, to the end of which a weight is hung; by this means the chain is kept tight, when the locomotive is turning curves, or otherwise.

The driving power is applied in the ordinary way to the wheels, and needs no particular description.

To adapt this to cars for burden there may be a modification of the parts and instead of the end wheels I can employ two oblong frames ($h$,) with semicircular or curved ends, which can be moved to keep the chains straight in the same way as the wheels around which there is a rail for an endless chain of pulleys to run. This latter consists of a double chain of flat links ($i$,) connected by the axes of a set of pulleys ($i'$,) which form the joints; the links holding the pulleys in place, and serving to guide them around the rail; the pulleys have flanches on their inner side, like the flanches of car wheels. Outside of this chain of pulleys I pass a chain ($k$,) and on this chain, (which is laid on the track, as described above) the pulleys travel. At either end of the frames I place horizontal pulleys or friction guide wheels ($m$,) which guide and direct the train around curves, by pressing against the side of the rail, as clearly illustrated by the drawing. A small guide pulley ($n$,) may also be applied to the chain ($k$,), at each end, near the track, if necessary. The track in the drawing is lettered ($s$.)

Having thus fully described my improvements in apparatus for transportation, I wish it to be understood that I do not claim an endless chain of wheels working against a stationary rail to support a carriage; nor do I claim laying down supports for said wheels, these having before been done; but

What I do claim as my improvement,

1. Is the combination of a chain of rollers with broad bearing surfaces running around a stationary rail or track on the carriage with an independent chain, which forms a track for said rollers to travel over when resting on the ground, and which passes around outside of said chain of rollers.

2. I also claim the mode of constructing said track chain (k,) by lapping the links thereof, so that the rollers shall have a constant bearing on the three plates which form two succeeding links, and break joint with each other, as clearly represented in Fig. 2.

GIDEON MORGAN.

Witnesses:
J. J. GREENOUGH,
WM. GREENOUGH.